(12) United States Patent
Gundy

(10) Patent No.: US 6,908,264 B1
(45) Date of Patent: Jun. 21, 2005

(54) QUICK CHANGE DRILL BIT

(76) Inventor: William P. Gundy, 16 Celina Ave., #13, Nashua, NH (US) 03063

( * ) Notice: Subject to any disclaimer, the term of this patent is extended or adjusted under 35 U.S.C. 154(b) by 25 days.

(21) Appl. No.: 10/288,922

(22) Filed: Nov. 6, 2002

(51) Int. Cl.$^7$ .............................................. B23B 51/04
(52) U.S. Cl. .................. 408/204; 408/1 R; 408/239 R; 279/43.3; 279/46.3; 279/93; 175/403; 125/20; 451/541
(58) Field of Search .......................... 408/1 R, 57, 59, 408/204, 206, 207, 209, 205, 231, 239 R, 408/703, 145, 233, 68; 175/403, 405.1; 451/541, 451/542, 547; 125/20; 279/93.94, 43.3, 46.3

(56) References Cited

U.S. PATENT DOCUMENTS

| | | | | |
|---|---|---|---|---|
| 2,996,061 | A | * 8/1961 | Miller | 408/59 |
| 3,163,190 | A | * 12/1964 | Ervin | 408/54 |
| 3,817,648 | A | * 6/1974 | Miller | 408/59 |
| 3,954,347 | A | * 5/1976 | Mechalas | 408/31 |
| 4,101,238 | A | 7/1978 | Reibetanz et al. | 408/59 |
| 4,468,826 | A | 9/1984 | Morres, Jr. | 7/158 |
| 4,664,567 | A | 5/1987 | Edwards | 408/59 |
| 4,692,073 | A | 9/1987 | Martindell | 408/239 |
| 4,777,715 | A | 10/1988 | Roberts | 29/568 |
| 5,098,234 | A | 3/1992 | Judkins et al. | 408/204 |
| 5,464,229 | A | 11/1995 | Salpaka | 279/30 |
| 5,775,704 | A | 7/1998 | Wilson et al. | 279/62 |
| 5,807,038 | A | * 9/1998 | Skinner | 408/204 |
| 5,810,366 | A | 9/1998 | Montjoy et al. | 279/43 |
| 5,947,484 | A | 9/1999 | Huggins et al. | 279/43.4 |
| 5,951,024 | A | 9/1999 | Montjoy et al. | 279/43 |
| 5,997,012 | A | * 12/1999 | Brian | 279/43.5 |
| 6,250,866 | B1 | 6/2001 | Devine | 411/387.4 |
| 6,260,857 | B1 | 7/2001 | Wienhold et al. | 279/62 |
| 6,315,060 | B1 | 11/2001 | Schuda et al. | 173/132 |
| 6,343,901 | B2 | 2/2002 | Wheeler et al. | 408/239 |
| 6,357,974 | B1 | 3/2002 | Robins | 408/240 |
| 6,634,444 | B2 | 10/2003 | Fuller et al. | 175/401 |

(Continued)

FOREIGN PATENT DOCUMENTS

GB  170193  * 10/1921 ................. 408/205

(Continued)

OTHER PUBLICATIONS

MSC Catalogue; Tool Holding—3 pages.

Primary Examiner—Daniel W. Howell
(74) Attorney, Agent, or Firm—Bourque & Assoc.

(57) ABSTRACT

A quick-change core drill includes an adapter and a generally tubular drill barrel. The adapter comprises a first end adapted to be removably connected to a drill spindle and a second end adapted to be removably connected to the drill barrel. The drill barrel includes an inside diameter D1, a first end, and a second end having a crown with an inside diameter D3. The first end of the drill barrel is adapted to be removably connected to the second end of the adapter such that the inside diameter D1 is at least as large as the inside diameter D3. Upon detection of a jammed core inside the drill barrel, the user can quickly and easily remove the jammed core from the drill barrel by disconnecting the drill barrel from the adapter. Since there are no obstructions present, the user can simply remove the jammed core from the first end of the drill barrel.

10 Claims, 6 Drawing Sheets

U.S. PATENT DOCUMENTS 6,637,987 B2    10/2003    Lui et al. ...................... 208/26

FOREIGN PATENT DOCUMENTS

| | | | | | |
|---|---|---|---|---|---|
| GB | 2263489 | * | 7/1993 | ........... | E21B 17/02 |
| JP | 8-90325 | * | 4/1996 | ........... | B23B 51/04 |
| JP | 9-1413 | * | 1/1997 | ........... | B23B 51/04 |
| JP | 11-123608 | * | 5/1999 | ........... | B23B 51/04 |
| JP | 11-198130 | * | 7/1999 | ........... | B23B 51/04 |
| JP | 2000-198007 | * | 7/2000 | ........... | B23B 51/04 |
| JP | 2002-120218 | * | 4/2002 | ........... | B23B 51/04 |

* cited by examiner

QUICK CHANGE DRILL BIT

TECHNICAL FIELD

The present invention relates to drills and more particularly, relates to core drills and core drill bits.

BACKGROUND INFORMATION

Thin wall diamond drills are widely used for drilling holes in concrete, reinforced concrete, block, glass, ceramics, and other hard natural and composite materials. Traditionally, the method of mounting thin wall diamond drills 1, FIG. 1, onto a drilling machine involves an internally threaded portion 2 fixed to one end 3 of the drill barrel 4, (usually 1¼"×7" female thread) that is threaded onto a male threaded drill spindle (not shown).

Even though diamond thin wall drills 1 are extremely efficient, the core 5 composed of the material being drilled often becomes jammed within the drill barrel 4 upon removal of the thin wall diamond drill 1 from the hole (not shown). Consequently, the jammed core 5 must be removed before the operator can drill another hole. Removing a jammed core 5 before drilling a subsequent hole reduces the overall efficiency of the drilling process, and sometimes takes much longer than the actual drilling cycle itself.

When drilling, a core of material 5 is formed within the drill barrel 4 which can sometimes break into pieces. The diameter of the core $D_C$ is approximately the same diameter as the inside diameter of the diamond crown $ID_C$. The difficulty arises when a portion of the core 5 breaks or becomes lose in the drill barrel 4. This difficulty arises from the fact that the $ID_B$ and the inside diameter of the threaded portion $D_T$ create an obstruction from removing the jammed core 5. $ID_B$ and $D_T$ are an obstruction because $ID_B$ is approximately the same diameter as $D_C$ and larger than $D_T$. Moreover, during the drilling cycle, the end 3 is threaded onto the drill spindle, thus any attempt at trying to remove a jammed core 5 from the drill barrel 4 by forcing the core out the diamond crown end would necessitate the removal of thin wall drill 1 from the drill spindle.

Accordingly, what is needed is a means to quickly and easily remove a jammed core from a drill barrel. The method should also be easily adaptable to existing drill spindles, thus allowing existing drills to be easily retrofitted without the necessity of any specialized tools.

SUMMARY

The present invention features a core drill comprising an adapter and a generally tubular drill barrel. The adapter includes a first end adapted to be removably connected to a drill spindle and a second end adapted to be removably connected to the generally tubular drill barrel. The generally tubular drill barrel has an inside diameter D1, a first end, and a second end having a drill crown with an inside diameter D3. The first end of the generally tubular drill barrel is adapted to be removably connected to the second end of the adapter such that D1 is at least as large as D3.

In one embodiment, the adapter is removably connected to the generally tubular drill barrel using a connection selected from the group consisting of a threaded connection, a latch, a clamp, a clasp, a slot, a bolt, and a channel. In a preferred embodiment, the adapter further includes a biasing portion that biases against the generally tubular drill barrel preventing the generally tubular drill barrel from moving relative to the adapter. The adapter preferably includes a cavity sized to accept the first end of the generally tubular drill barrel, at least one locating stop, a drill barrel stop, and an o-ring. The generally tubular drill barrel preferably includes at least one slot which is preferably "L" shaped.

In another embodiment, the present invention also features a method of removing a jammed core from a core drill attached to a spindle on a drill. The method includes disconnecting a first end of the core drill barrel from the second end of the adapter. Next, the user removes the jammed core from the first end of the core drill barrel such that a first end of the adapter remains connected to the spindle while the jammed core is removed from the core drill barrel. Once removed, the user reconnects the first end of the core drill barrel to the second end of the adapter.

The act of reconnecting the core drill barrel to the adapter preferably comprises connecting the first end of the core drill barrel to the second end of the adapter such that an inside diameter D1 of the core drill barrel is larger than the inside diameter D3 of a crown disposed on a second end of the core drill barrel. In the exemplary embodiment, the user first slides the first end of the core drill barrel into a cavity disposed within the second end of the adapter. Next the user aligns a slot disposed on the first end of the drill barrel with a locating stop disposed in the cavity of the adapter. The user then positions the first end of the core drill barrel against a drill barrel stop disposed within the cavity of the adapter. Finally, the user biases a portion of the adapter against the first end of the core drill barrel.

Alternatively, the act of reconnecting the first end of the hollow core drill barrel to the adapter comprises threading the first end of the hollow core drill barrel into the second end of the adapter.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
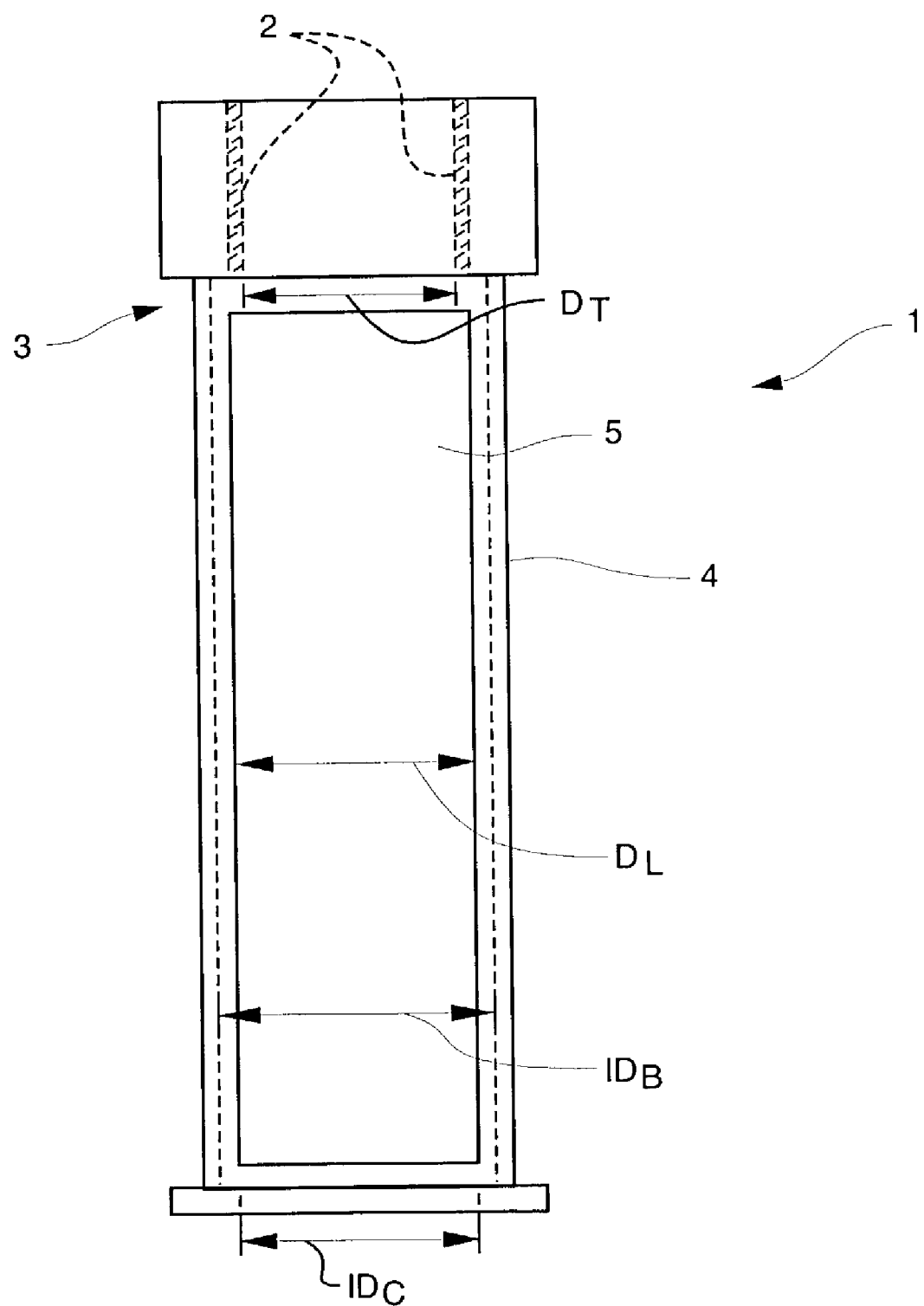
FIG. 1 is plain view of a prior art drill bit.
Figure 2:
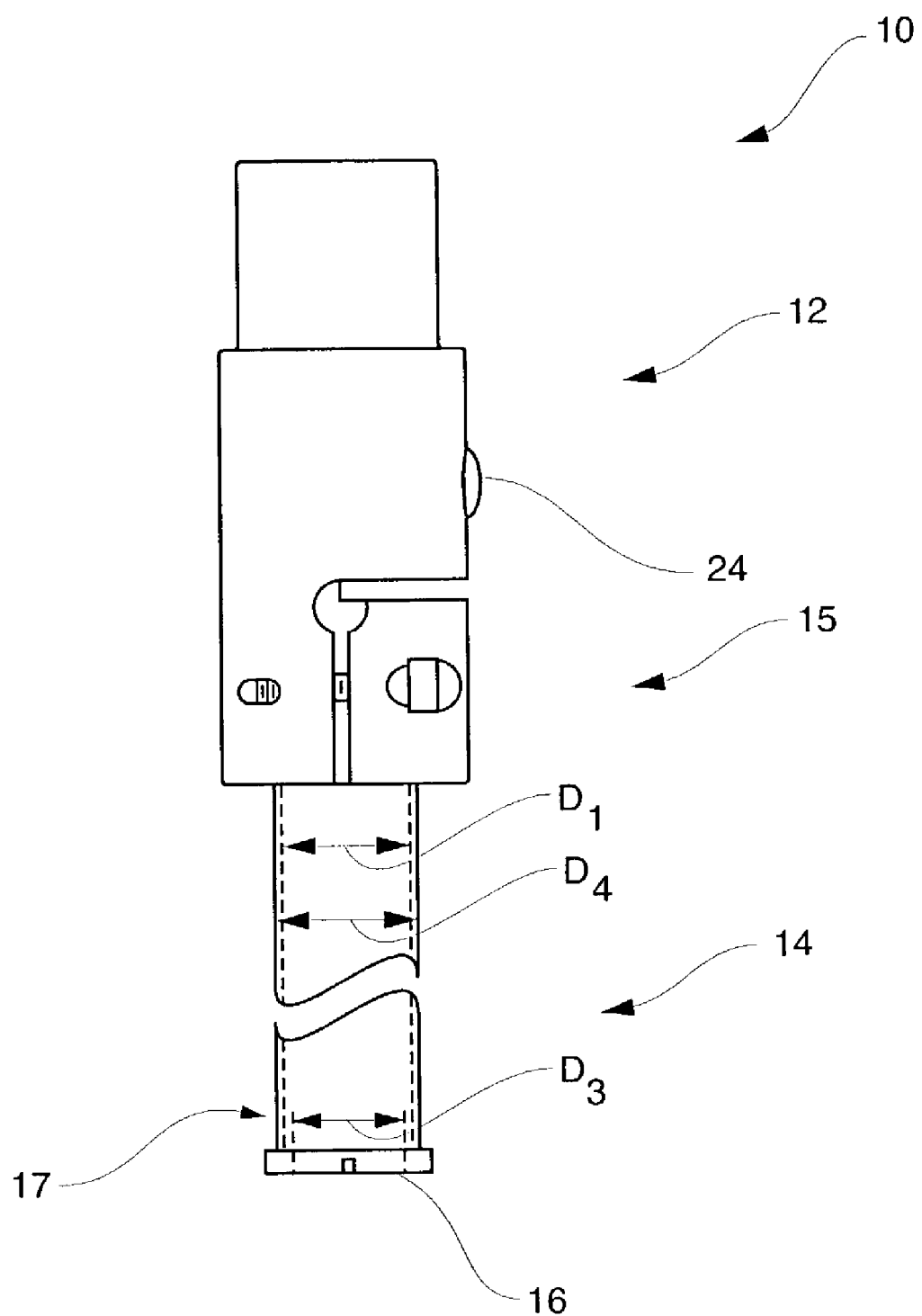
FIG. 2 is plain view of the adapter and drill barrel according to one embodiment of the present invention.

A quick change core drill 10, FIG. 2, in accordance with the present invention, allows a user to quickly and easily remove a jammed core (not shown) from a drill barrel and includes an adapter 12 and a drill barrel 14. The adapter 12 is preferably adapted to thread onto a drill spindle (not shown) in the conventional manner; however, the adapter 12 may be connected to or part of the drill spindle in any manner known to those skilled in the art.

The drill barrel 14 is adapted to be removably connected to the adapter 12 such that upon the detection of a jammed core, the user simply disconnects the drill barrel 14 from the adapter 12 thus allowing the user to simply slide the jammed core out of the unrestricted end of drill barrel 14 as will be described in greater detail below. Once the jammed core is removed from the drill barrel 14, the user simply reconnects the drill barrel 14 to the adapter 12, and is ready to begin drilling another hole.

Figure 3:
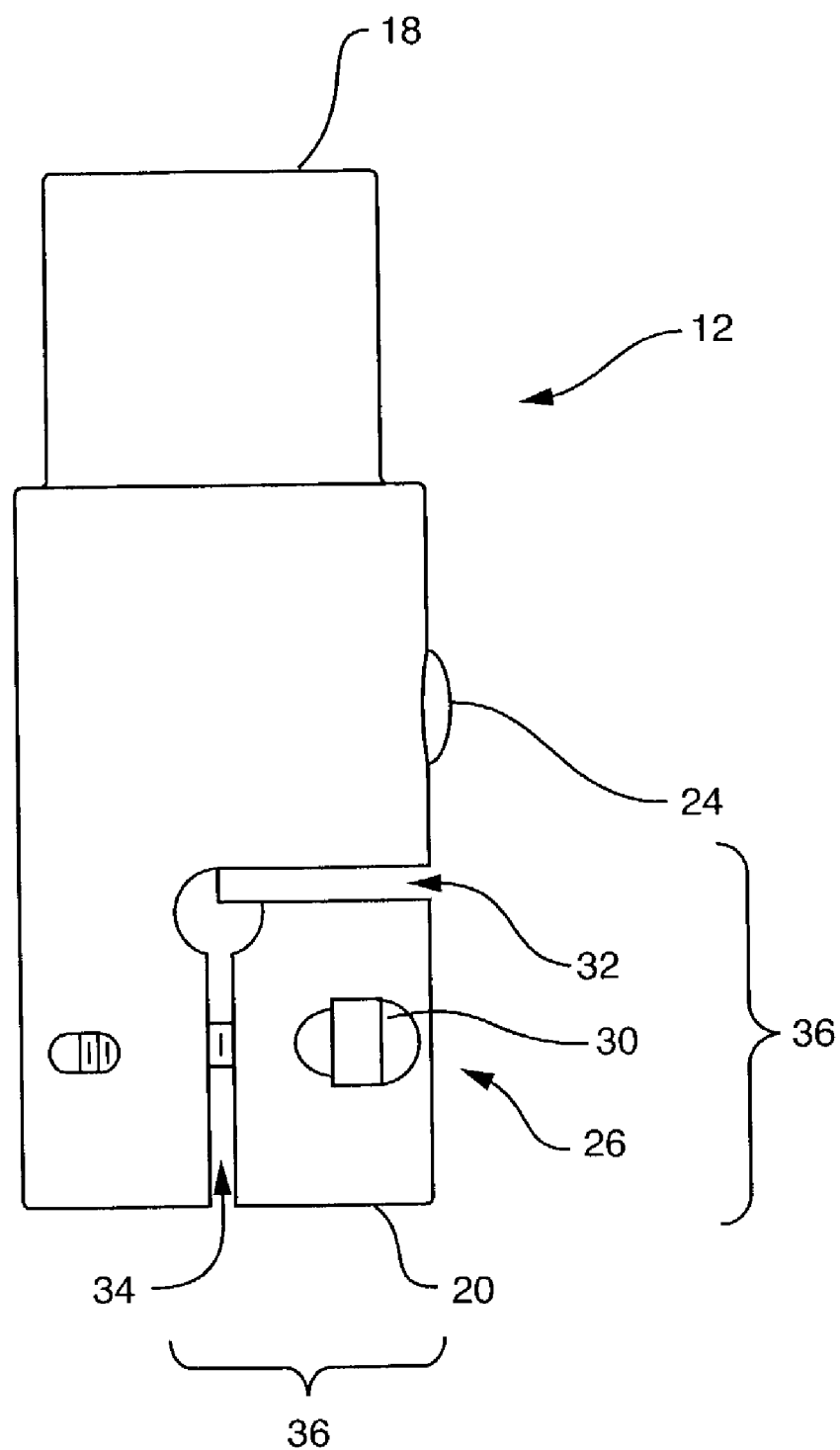
FIG. 3 is plain view of one embodiment of the adapter according to the present invention.
Figure 4:
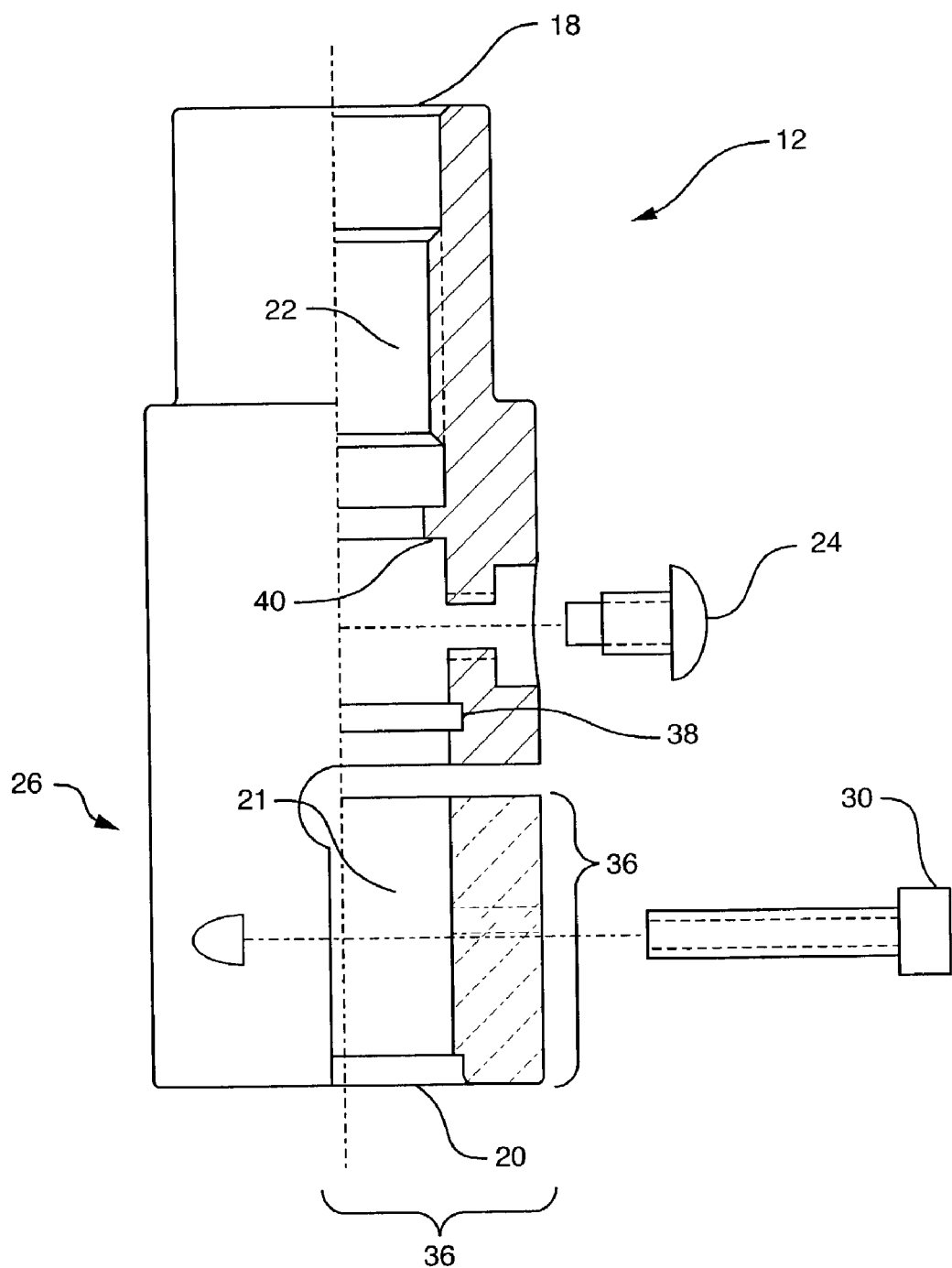
FIG. 4 is a cross sectional view of one embodiment of the adapter according to the present invention.
Figure 5:
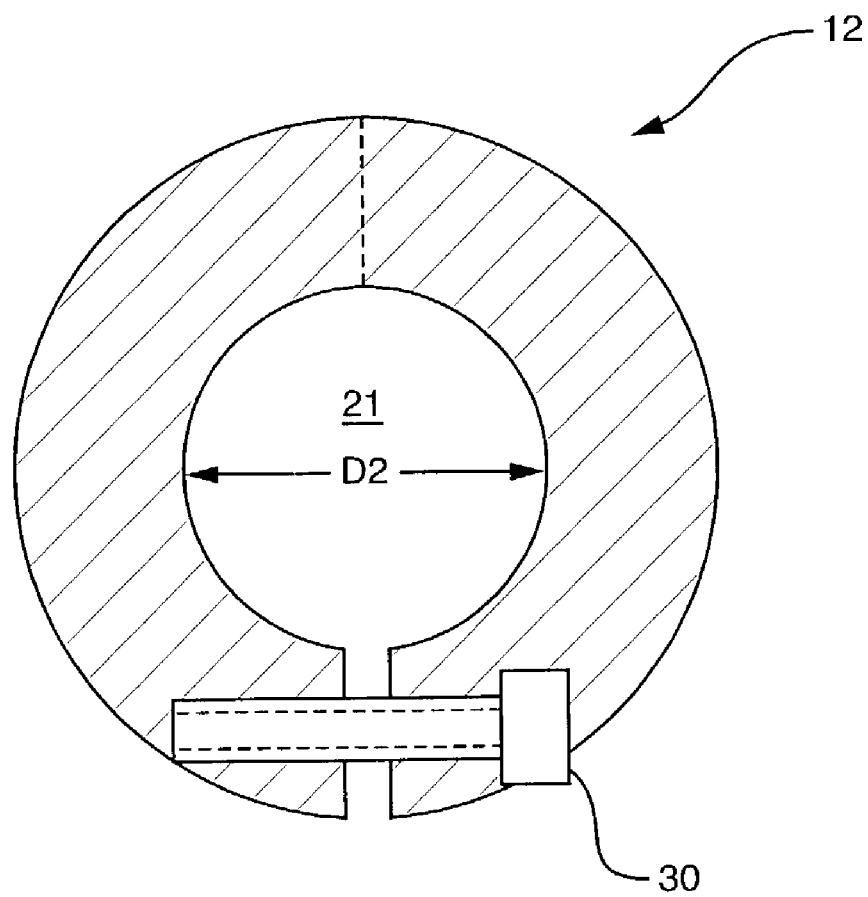
FIG. 5 is a plain view of the second end of one embodiment of the adapter according to the present invention.

The adapter 12, FIGS. 3–5, includes a first end 18 that is adapted to be connected to a drill spindle and a second end 20 that is adapted to be connected to the drill barrel 14. In the preferred embodiment, the first end 18 includes a threaded region 22 that is adapted to threadably connect with the drill spindle in the traditional manner known to those skilled in the art. As noted, however, the first end 18 may also connect to the drill's spindle (or the drill in general) in any manner now known or hereinafter discovered.

The second end 20 of the adapter 12 is adapted to be removably connected to the drill barrel 14 in any manner known to those skilled in the art wherein the diameter D1 of the inside of the drill barrel 14 is at least as large as the inside diameter D3 of the crown 16 of the drill barrel 14, such that a jammed core may be removed from the first end 15 of the drill barrel 14 without obstruction.

For example, the adapter 12 may be removably connected to the drill barrel 14 using a latch, clamp, clasp, slot, bolt, channel, or other mechanical means for biasing the adapter 12 against the drill barrel 14 and holding the adapter 12 reasonably secure in place in the drill barrel 14, while permitting the combination adapter/barrel to function as a core drill.

In one embodiment, at least one bolt may bias directly against an outside surface of the drill barrel 14 or is adapted to be disposed within an aperture or slot disposed on the drill barrel 14. Alternatively, the second end 20 of the adapter 12 and the first end 15 of the drill barrel 14 may be threadably connected having a male and female end. In yet another embodiment, the second end 20 of the adapter 12 and the first end 15 of the drill barrel 14 are "keyed" to prevent movement of the second end 20 of the adapter 12 and the first end 15 of the drill barrel 14 relative to each other.

According to the preferred embodiment, the second end 20 includes a cavity 21 having a diameter D2 that is approximately the same size as the diameter D4 of the drill barrel 14 and a biasing portion 36. The biasing portion 36 includes a clamping means 26 and is defined by a first 32 and at least a second 34 slot having a radius and length sufficient to allow the biasing portion 36 to prevent movement of the drill barrel 14 relative to the adapter 12. The exact dimensions of the first 32 and second 34 slot will, of course, depend on the characteristics of the materials used, material to be drilled through, size of the drill barrel 14, intended use, as well as numerous other factors, and is within the knowledge of one skilled in the art. As an example, the first slot 32 is approximately 180 degrees and the second slot 34 is approximately 1.75 inches in length.

The clamping means 26 includes any method of biasing the biasing portion 36 against the drill barrel 14 such as, but not limited to, a clasp, clamp, or fastener 30. In the preferred embodiment, the clamping means 26 is a bolt that decreases the diameter D2 of the cavity 21 as the bolt is rotated, thus biasing the biasing portion 36 against the drill barrel 14.

In yet another embodiment, the adapter 12 includes an o-ring 38 which prevents the coolant used in drilling from being lost through the adapter 12.

Figure 6:
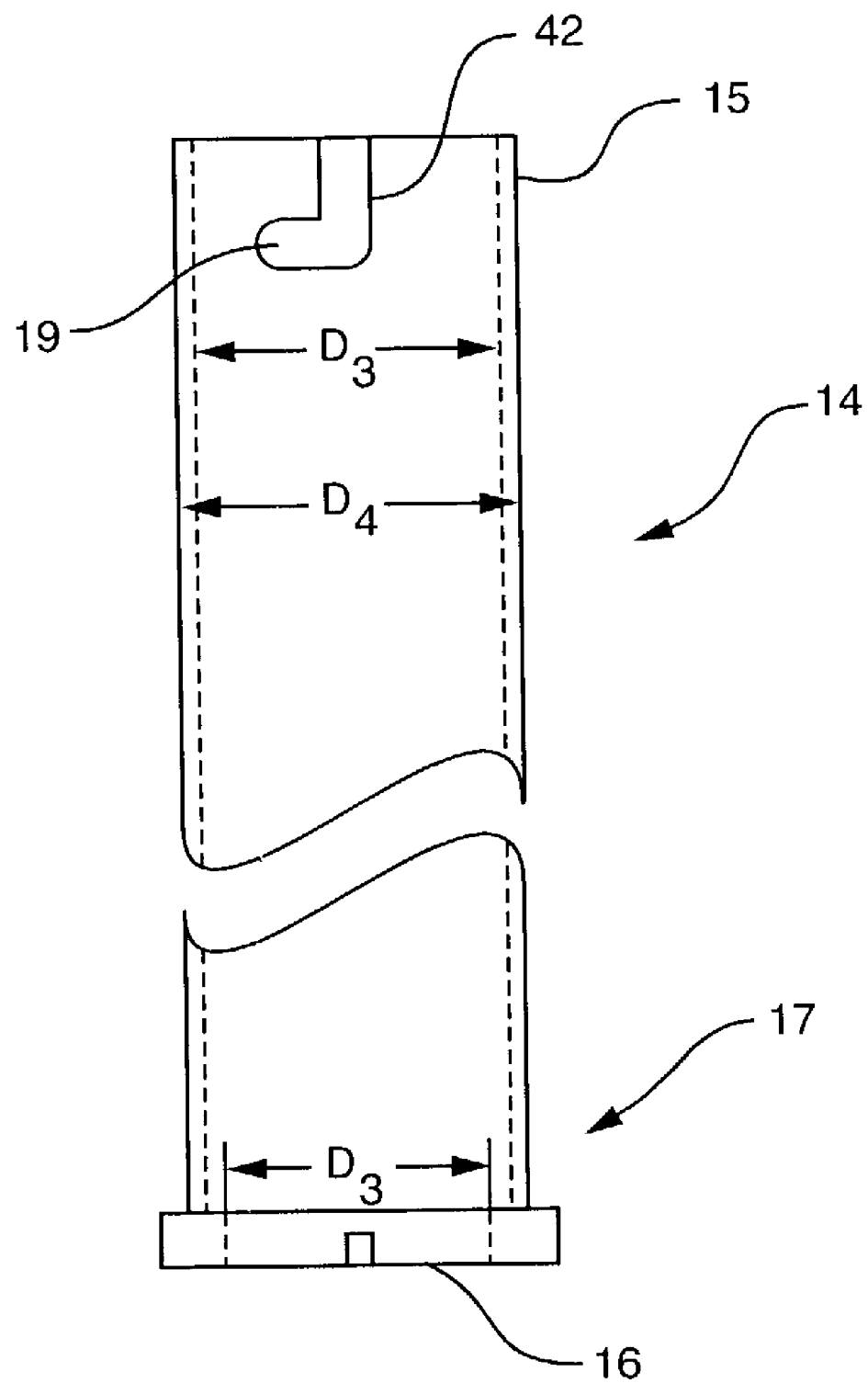
FIG. 6 is a plain view of one embodiment of the drill barrel according to the present invention.

The drill barrel 14, FIG. 6, includes a drill tip or crown 16 disposed on the second end 17. Of course, drill tip or crown 16 as well as the dimensions and materials of construction of the drill barrel 14 will depend upon the intended circumstance of use and are within the knowledge of one skilled in the art. In the preferred embodiment, the drill tip or crown 16 includes a diamond crown made from powdered metal such as tungsten, tungsten carbide, titanium iron, etc., with a diameter of 0"–12" and a thickness of 0.060"–0.250".

As described above, first end 15 of the drill barrel 14 is at least as large as the inside diameter D3 of the crown 16 of the drill barrel 14 such that a jammed core may be removed from the first end 15 of the drill barrel 14 without obstruction and is adapted to be connected to the adapter 12. Accordingly, the exact dimensions and arrangement of the first end 15 will depend upon the method of connection.

In the preferred embodiment, the first end 15 includes at least one slot or channel 42, FIG. 6, and the adapted 12 at least one locating stop 24, FIGS. 2–4 and preferably a drill barrel stop 40. The drill barrel stop 40 and the locating stop 24 position the drill barrel 14 and, working in conjunction with the biasing portion 16, prevent the drill barrel 14 from moving relative to the adapter 12. The slot or channel 42 is preferably an "L" shaped slot to prevent barrel from pulling out of adaptor in a jam; however, other shapes such as, but not limited to, a curved or straight slot are also contemplated.

In practice, the user slides the drill barrel 14 into the cavity 21 within the adapter 12 and aligns the "L" shaped slot or channel 42 with the locating stop 24 until the first end 15 of the drill barrel 14 contacts the drill barrel stop 40. Next, the user rotates the drill barrel 14 until locating top 24 is positioned within the region 19 of the "L" shaped slot or channel 42. Lastly, the user tightens or biases the biasing portion 36 using the bolt 30.

Upon detection of a jammed core, the user can quickly and easily remove the drill barrel 14 from the adapter 12 by releasing the biasing portion 36, rotating the drill barrel 14 from region 19, and sliding the drill barrel out of the cavity 21. Now the user can remove the jammed core from the first end 15 since there are no obstructions present.

Modifications and substitutions by one of ordinary skill in the art are considered to be within the scope of the present invention, which is not to be limited except by the following claims.

The invention claimed is:

1. A core drill comprising an adapter and a generally tubular drill barrel, said adapter comprising a first end adapted to be removably connected to a drill spindle, a second end having a cavity adapted to be removably connected to said first end of said generally tubular drill barrel, at least one locating stop, and a biasing portion having at least one slot defining a biasing region biasing against said generally tubular drill barrel and preventing said generally tubular drill barrel from moving relative to said adapter; said generally tubular drill barrel comprising an inside diameter D1, a first end, a second end having a crown with an inside diameter D2, and a substantially "L" shaped slot, wherein said first end of said generally tubular drill barrel is adapted to be removably connected to said second end of said adapter such that said inside diameter D1 is at least as large as said inside diameter D2.

2. The core drill as claimed in claim 1 wherein said biasing region is biased against said generally tubular drill barrel using a bolt.

3. The core drill as claimed in claim 1 wherein said adapter further includes a drill barrel stop.

4. The core drill as claimed in claim 1 wherein said adapter further includes an o-ring disposed within said cavity.

5. A core drill comprising
an adapter including:
- a biasing portion having and at least one slot defining a biasing region;
- a first end adapted to be removably connected to a drill spindle; and
- at least one locating stop; and a generally tubular drill barrel including:
- a first end adapted to be removably connected to a second end of said adapter;
- a crown disposed proximate a second end; and
- at least one "L" shaped slot proximate said first end, said "L" shaped slot adapted to be removably connected to said at least one locating stop, wherein said biasing portion and said least one "L" shaped slot prevent said generally tubular drill barrel from moving relative to said adapter.

6. The core drill as claimed in claim 5 wherein said biasing region is biased against said generally tubular drill barrel using a bolt.

7. The core drill as claimed in claim 5 wherein said adapter further includes a drill barrel stop.

8. A core drill comprising
an adapter including:
- a biasing portion having at least one slot defining a biasing region;
- a first end of said adapter adapted to be removably connected to a drill spindle;
- a cavity disposed proximate a second end of said adapter;
- at least one locating stop; and
- an o-ring disposed within said cavity; and a generally tubular drill barrel including:
- a first end of said generally tubular drill barrel adapted to be removably disposed within said cavity of said second end of said adapter, wherein said O-ring creates a seal between said adapter and said first end of said generally tubular drill barrel;
- a crown disposed proximate a second end of said generally tubular drill barrel; and
- at least one generally "L" shaped opening disposed proximate said first end of said generally tubular drill barrel, said opening adapted to engage said at least one locating stop, wherein said biasing portion and said least one opening prevent said generally tubular drill barrel from moving relative to said adapter.

9. A method of attaching a hollow core drill to a drill spindle comprising:
- connecting a first end of an adapter to said drill spindle;
- sliding said first end of said drill barrel into a cavity disposed within second end of said adapter;
- aligning a generally "L" shaped opening disposed proximate said first end of said drill barrel with a locating stop disposed in said cavity of said adapter;
- positioning said first end of said drill barrel against a drill barrel stop disposed within said cavity of said adapter; and
- biasing a portion of said adapter against said first end of said drill barrel, wherein an inside diameter D1 of said drill barrel is at least as large as an inside diameter D2 of a crown disposed on a second end of said drill barrel.

10. A method of removing a jammed core from a hollow core drill attached to a spindle on a drill comprising:
- disconnecting a first end of a hollow core drill barrel from a second end of an adapter;
- removing said jammed core from said first end of said hollow core drill barrel such that a first end of said adapter remains connected to said spindle while said jammed core is removed from said hollow core drill barrel; and
- reconnecting said first end of said hollow core drill barrel to said second end of said adapter such that an inside diameter D1 of said hollow core drill barrel is at least as large as an inside diameter D2 of a crown disposed on a second end of said hollow core drill barrel, said act including:
  - sliding said first end of said hollow core drill barrel into a cavity disposed within said second end of said adapter;
  - aligning an opening disposed on said first end of said drill barrel with a locating stop disposed in said cavity of said adapter;
  - positioning said first end of said hollow core drill barrel against a drill barrel stop disposed within said cavity of said adapter; and
  - biasing a portion of said adapter against said first end of said hollow core drill barrel.

* * * * *